April 28, 1931. J. F. KIENNINGER 1,803,115
CINEMATOGRAPHIC APPARATUS
Filed Jan. 25, 1930
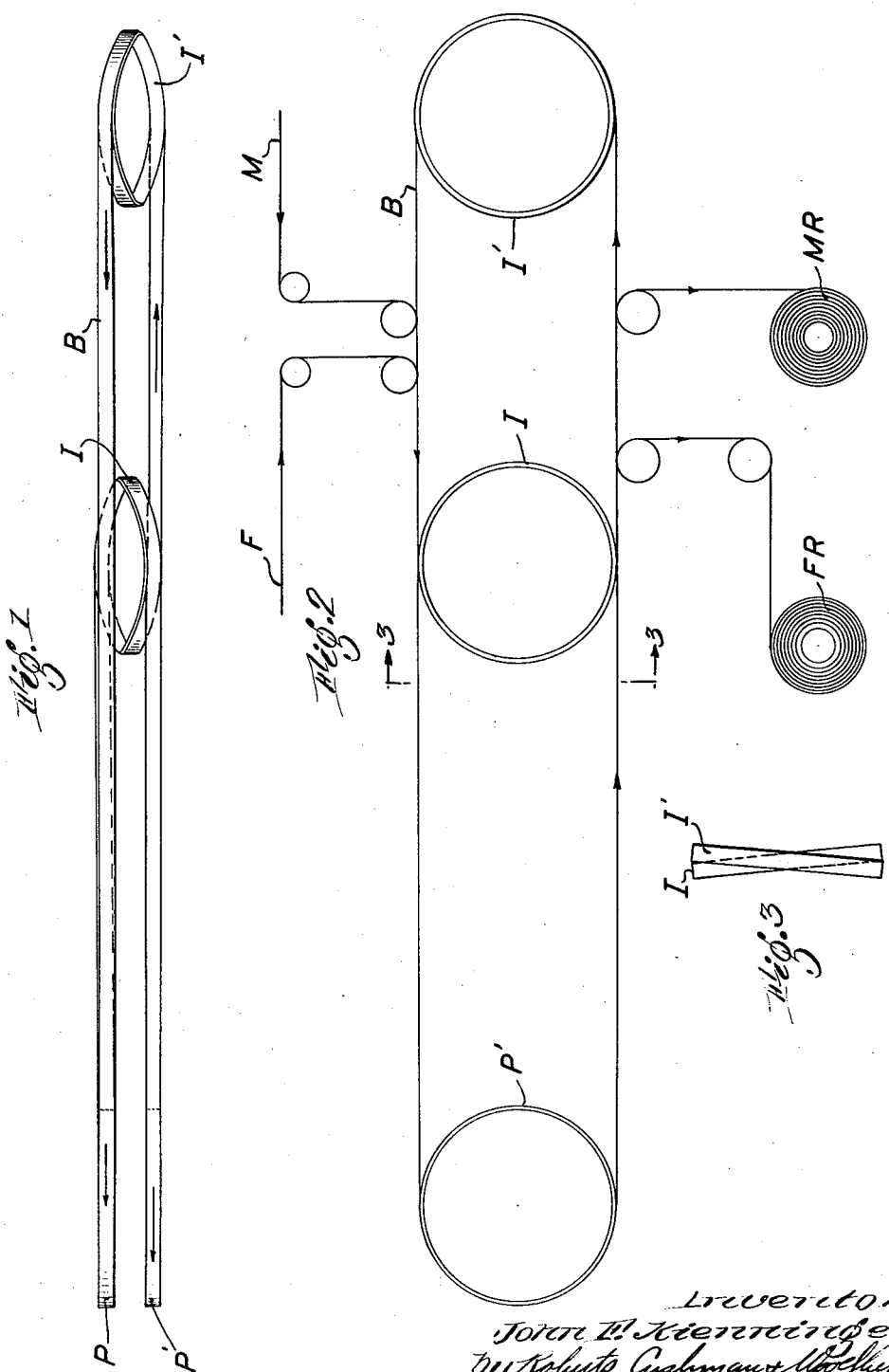

Patented Apr. 28, 1931

1,803,115

UNITED STATES PATENT OFFICE

JOHN F. KIENNINGER, OF NORTH CAMBRIDGE, MASSACHUSETTS, ASSIGNOR TO TECHNICOLOR MOTION PICTURE CORPORATION, OF BOSTON, MASSACHUSETTS, A CORPORATION OF MAINE

CINEMATOGRAPHIC APPARATUS

Application filed January 25, 1930. Serial No. 423,353.

In the art of cinematography it is frequently desirable to subject film to a prolonged treatment and at the time to feed the film continuously through the treating apparatus. For example, in printing a blank film by imbibition from a dye-soaked matrix, film it is necessary to hold the films in intimate contact for several minutes to permit the blank film to imbibe the dye from the matrix. Prior to this invention the best way of obtaining this result in a continuous machine has involved a long approximately straight film path as disclosed in the patent to Comstock, 1,707,710, granted April 2, 1929. However, this arrangement requires either a long machine or a slow rate of film travel. The principal object of the present invention, therefore, is to obtain the advantages of the aforesaid type of machine and at the same time reduce the length of the machine and/or increase the rate of film travel so that more film may be processed in a given length of time.

As in the aforesaid patent, the present invention preferably utilizes an endless belt for conducting the film along a predetermined path and, especially for imbibition uses, the belt is preferably provided with registering pins for interengagement with the sprocket holes of the film. The belt travels in a plurality of loops and at least one wheel is provided in each end of each loop for supporting and guiding the belt. The axes of certain of the wheels are inclined transversely of the loops so that each wheel at one end of the loops is longitudinally aligned with the periphery of a wheel at the other end of the loops. Thus the stretches of belt and film bridging aligned peripheries at opposite ends of the loops, while they may be twisted through an angle less than ninety degrees due to the aforesaid inclination of one or more of the wheels, are not subjected to unequal tension transversely of the belt and films. The inclined wheels may be at the same end or at opposite ends of the loop and they may be inclined in the same or opposite directions. However, the inclined wheels are preferably at the same end and are preferably inclined in opposite directions.

For the purpose of illustrating the genus of the invention, a typical embodiment is shown in the accompanying drawings in which:

Fig. 1 is a diagrammatic plan view;

Fig. 2 is a diagrammatic side elevation; and

Fig. 3 is an end elevation of the two inclined wheels.

The particular embodiment of the invention chosen for the purpose of illustration comprises two wheels P and P' arranged in axial alignment at one of the loops and two wheels I and I' oppositely inclined at the other end of the loops with the two wheels I and I' offset with respect to each other longitudinally of the loops. The upper side of wheel I' is in tangential alignment with the upper side of wheel P, the lower side of wheel P is in tangential alignment with the lower side of wheel I, the upper side of wheel I is in tangential alignment with the upper side of wheel P' and the lower side of wheel P' is in tangential alignment with the lower side of wheel I'. Thus the endless belt B feeds continuously around the wheels, the direction of movement of the four stretches of belt being indicated by arrows, the arrows associated with the upper stretches being solid and the arrows associated with the lower stretches being broken. As will be evident from Fig. 1 the stretches of belt extending from wheel I' to the opposite ends of the loops clear the wheel I with a wide margin of spacing due to the opposite inclination of the two wheels I and I'. In using this apparatus for imbibition purposes, matrix and blank films may be fed onto the belt as indicated at M and F and, after having traversed the major portion of both loops, may be guided to take-up reels MR and FR. Inasmuch as all of the details of construction of apparatus of this character are disclosed in the aforesaid patent further description is unnecessary for a full understanding of the present invention.

It will, of course, be understood that many modifications may be made within the scope of the appended claims. For example instead of having only two loops any desired number may be employed as for example by duplicating the wheels P and I and increasing the size and inclination of the wheel I'.

I claim:

1. Cinematographic apparatus for feeding film along a series of loops comprising opposed sets of film wheels, the peripheries of the wheels of one set tangentially aligning with the peripheries of the wheels of the other set and the axes of certain of the wheels being oppositely inclined to each other transversely of the loops.

2. Cinematographic apparatus for feeding film along a series of loops comprising opposed sets of film wheels, the peripheries of the wheels of one set tangentially aligning with the peripheries of the wheels of the other set and the axes of wheels of one set being oppositely inclined to each other transversely of the loops.

3. Cinematographic apparatus comprising an endless belt in a plurality of loops, and a wheel in each end of each loop, the axes of certain of the wheels being oppositely inclined transversely of the loops with opposite sides of each wheel at each end of the loops substantially in tangential alignment with the peripheries of wheels at the other end of the loops, whereby the belt may be fed continuously around said loops substantially without unequal tension transversely of the belt.

4. Cinematographic apparatus comprising an endless belt in a plurality of loops, and a wheel in each end of each loop, the wheels at one end of the loops being coaxial and the wheels at the other end of the loops being oppositely inclined transversely of the loops to align the periphery of each wheel at one end of the loops with the periphery of a wheel at the other end of the loops, whereby the belt may be fed continuously around said loops substantially without unequal tension transversely of the belt.

5. Cinematographic apparatus comprising an endless belt in a plurality of loops, and a wheel in each end of each loop, the axes of two wheels at one end of the loops being oppositely inclined transversely of the loops so that opposite sides of their peripheries are offset in opposite directions in tangential alignment with different wheels at the other end of the loops, whereby the endless belt may be fed continuously around said loops substantially without unequal tension transversely of the belt.

6. Cinematographic apparatus comprising an endless belt in a plurality of loops, and a wheel in each end of each loop, the axes of wheels at one end of the loops being parallel and the axes of wheels at the other end of the loops being inclined to each other transversely of the loops to align the periphery of each wheel at one end of the loops with the periphery of a wheel at the other end of the loops, whereby the belt may be fed continuously around said loops substantially without unequal tension transversely of the belt.

7. Cinematographic apparatus comprising an endless belt in a plurality of loops, and a wheel in each end of each loop, the axes of certain of the wheels being parallel and the axes of other of the wheels being inclined transversely of the loops to align the periphery of each wheel at one end of the loops with the periphery of a wheel at the other end of the loops, whereby the belt may be fed continuously around said loops substantially without unequal tension transversely of the belt.

8. Cinematographic apparatus comprising an endless belt in a plurality of loops, and a wheel in each end of each loop, the axes of certain of the wheels at one end of the loops being inclined to each other transversely of the loops to align the periphery of each wheel at one end of the loops with the periphery of a wheel at the other end of the loops, whereby the belt may be fed continuously around said loops substantially without unequal tension transversely of the belt.

9. Cinematographic apparatus comprising an endless belt in a plurality of loops, and a wheel in each end of each loop, the axes of certain of the wheels being inclined transversely of the loops to align the periphery of each wheel at one end of the loops with the periphery of a wheel at the other end of the loops, whereby the belt may be fed continuously around said loops substantially without unequal tension transversely of the belt.

Signed by me at Boston, Massachusetts, this twenty-first day of January, 1930.

JOHN F. KIENNINGER.